(12) United States Patent
Nakayama et al.

(10) Patent No.: US 12,540,085 B2
(45) Date of Patent: Feb. 3, 2026

(54) WATER-USING APPARATUS

(71) Applicant: Mitsubishi Electric Corporation, Tokyo (JP)

(72) Inventors: Yoshihiro Nakayama, Tokyo (JP); Tadashi Saito, Tokyo (JP); Seiji Noda, Tokyo (JP); Masaru Takada, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 437 days.

(21) Appl. No.: 17/767,918

(22) PCT Filed: Dec. 13, 2019

(86) PCT No.: PCT/JP2019/048972
§ 371 (c)(1),
(2) Date: Apr. 11, 2022

(87) PCT Pub. No.: WO2021/117229
PCT Pub. Date: Jun. 17, 2021

(65) Prior Publication Data
US 2024/0101452 A1    Mar. 28, 2024

(51) Int. Cl.
*C02F 1/469* (2023.01)
*C02F 1/00* (2023.01)
*F24F 6/00* (2006.01)

(52) U.S. Cl.
CPC ............ *C02F 1/4691* (2013.01); *C02F 1/008* (2013.01); *C02F 2303/16* (2013.01); *F24F 2006/006* (2013.01)

(58) Field of Classification Search
CPC .... C02F 1/4691; C02F 1/0008; C02F 1/4602; C02F 2303/16; C02F 2001/46133;
(Continued)

(56) References Cited

U.S. PATENT DOCUMENTS

2008/0073288 A1\*  3/2008  Fan ........................ C02F 1/4691
                                                            204/554
2011/0042206 A1\*  2/2011  Tanahashi ............. C02F 1/4602
                                                            204/278.5
(Continued)

FOREIGN PATENT DOCUMENTS

JP            6-31275 A      2/1994
JP       2001058180 A  *   3/2001
(Continued)

OTHER PUBLICATIONS

Hashizume et al., English translation of JP2012145244A, 2012 (Year: 2012).\*

(Continued)

*Primary Examiner* — Shizhi Qian
(74) *Attorney, Agent, or Firm* — XSENSUS LLP

(57) ABSTRACT

A water-using apparatus includes a water-feeding unit configured to feed water, a water-treating unit connected to the water-feeding unit by a pipe and being configured to perform a function in which ionic substances contained in water fed from the water-feeding unit are removed by an electrical deionization unit, a water-using unit connected to the water-treating unit by a pipe and configured to use water having flowed through the water-treating unit, a drainpipe through which water with increased concentration of ionic substances removed by the water-treating unit is drained, and a controller configured to control a passage for water fed from the water-feeding unit and to cause water with increased concentration of ionic substances to be drained through the drainpipe.

18 Claims, 5 Drawing Sheets

(58) Field of Classification Search
CPC ...... C02F 2103/023; C02F 2201/46145; F24F 2006/006
See application file for complete search history.

(56) References Cited

U.S. PATENT DOCUMENTS

| | | | | |
|---|---|---|---|---|
| 2015/0192210 | A1* | 7/2015 | Averbeck | C02F 1/469 137/625.67 |
| 2015/0374895 | A1* | 12/2015 | Friederichs | C02F 1/42 210/87 |
| 2016/0068413 | A1 | 3/2016 | Ukai et al. | |
| 2018/0044207 | A1 | 2/2018 | Li et al. | |
| 2018/0282183 | A1* | 10/2018 | Curran | F24F 6/00 |
| 2020/0087174 | A1* | 3/2020 | Rajic | C02F 1/46109 |
| 2021/0053849 | A1 | 2/2021 | Nakayama et al. | |

FOREIGN PATENT DOCUMENTS

| | | | | | |
|---|---|---|---|---|---|
| JP | 2001-129551 | A | | 5/2001 | |
| JP | 2003-190988 | A | | 7/2003 | |
| JP | 2011-43314 | A | | 3/2011 | |
| JP | 2012145244 | A | * | 8/2012 | |
| JP | 2013-13853 | A | | 1/2013 | |
| JP | 2018-517543 | A | | 7/2018 | |
| WO | 2014/163094 | A1 | | 10/2014 | |
| WO | WO-2018083849 | A1 | * | 5/2018 | ............ B01D 35/16 |
| WO | WO-2018179717 | A1 | * | 10/2018 | .......... C02F 1/46109 |
| WO | 2019/193901 | A1 | | 10/2019 | |

OTHER PUBLICATIONS

Tajima et al., English translation of JP2001058180A, 2001 (Year: 2001).*
An et al., English translation of WO2018179717A1, 2018 (Year: 2018).*
An et al., English translation of WO2018083849A1, 2018 (Year: 2018).*
International Search Report and Written Opinion mailed on Mar. 10, 2020, received for PCT Application PCT/JP2019/048972, Filed on Dec. 13, 2019, 12 pages including English Translation.
Notice of Reasons for Refusal mailed on Aug. 18, 2020, received for JP Application 2020-529769, 15 pages Including English Translation.
Decision of Refusal mailed on Dec. 1, 2020, received for JP Application 2020-529769, 16 pages including English Translation.
Notice of Reasons for Refusal mailed on Mar. 1, 2022, received for JP Application 2021-022592, 14 pages including English Translation.
Office Action issued May 1, 2024 in Chinese Patent Application No. 201980102804.3, 12 pages.
Chinese Office Action issued Aug. 10, 2023 in corresponding Chinese Patent Application No. 201980102804.3 (with machine-generated English translation), 19 pages.
Decision of Rejection issued Jul. 20, 2024 in corresponding Chinese Patent Application No. 201980102804.3 with machine English translation thereof.

* cited by examiner

DRAIN WATER

WATER-USING APPARATUS

CROSS-REFERENCE TO RELATED APPLICATION

The present application is based on PCT filing PCT/JP2019/048972, filed Dec. 13, 2019, the entire contents of which is incorporated herein by reference.

TECHNICAL FIELD

The present disclosure relates to a water-using apparatus including a water-treating unit capable of removing ionic substances from water.

BACKGROUND ART

Known water-using apparatuses including devices such as humidifiers have problems including scale deposition caused by scaly ions such as calcium ions or magnesium ions contained in water that is fed to the devices such as humidifiers. In view of such circumstances, for example, a humidifying device disclosed by Patent Literature 1 includes a feedwater tank capable of efficiently removing hardness-component ions. The feedwater tank includes a tank body that stores water, and a container provided inside the tank body. The container contains a large number of balls of ion-exchanger resin that remove hardness-component ions. In the humidifying device, water stored in the tank body flows into the container and comes into contact with the ion-exchanger resin, whereby hardness-component ions in the water are adsorbed to the ion-exchanger resin. Thus, the ion-exchanger resin is removed from the water.

CITATION LIST

Patent Literature

Patent Literature 1: Japanese Unexamined Patent Application Publication No. 2011-43314

SUMMARY OF INVENTION

Technical Problem

In the humidifying device disclosed by Patent Literature 1, however, when the amount of deionization reaches the capacity of ion exchange, no more ionic substances can be removed. Therefore, to continuously perform deionization with such a humidifying device, the ion-exchanger resin needs to be replaced with new one, which is troublesome and costly.

The present disclosure is to solve the above problem and to provide a water-using apparatus capable of continuously removing ionic substances from feedwater with no replacement of ion-exchanger resin or any other relevant elements.

Solution to Problem

A water-using apparatus of an embodiment of the present disclosure includes a water-feeding unit configured to feed water, a water-treating unit connected to the water-feeding unit by a pipe and having a function in which ionic substances contained in water fed from the water-feeding unit are removed by an electrical deionization unit, a water-using unit connected to the water-treating unit by a pipe and configured to use water having flowed through the water-treating unit, a drainpipe through which water with increased concentration of ionic substances removed by the water-treating unit is drained, and a controller configured to control a passage for water fed from the water-feeding unit and to cause water with increased concentration of ionic substances to be drained through the drainpipe.

Advantageous Effects of Invention

According to the above embodiment of the present disclosure, the passage of water that is fed from the water-feeding unit is controlled such that water with increased concentration of ionic substances removed by the water-treating unit is drained through the drainpipe. Therefore, ion-exchanger resin or any other relevant elements do no need to be exchanged. Consequently, the removal of ionic substances from the feedwater can be performed continuously for a long term.

DESCRIPTION OF EMBODIMENTS

Figure 1:
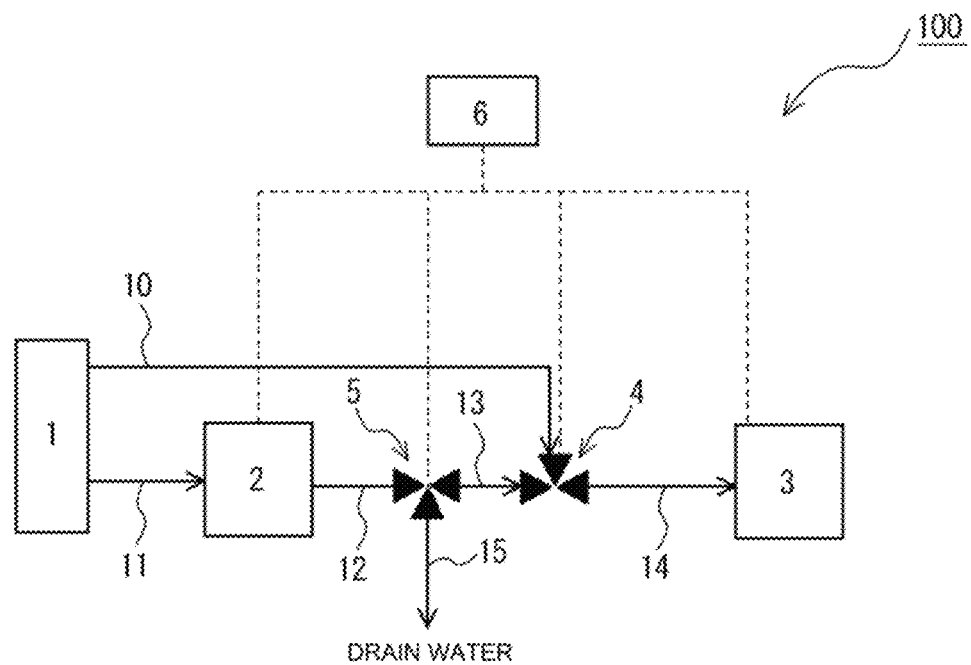
FIG. 1 is a schematic diagram of a water-using apparatus according to Embodiment 1.

Embodiments of the present disclosure will now be described with reference to the drawings. In the drawings, the same or equivalent elements are denoted by the same reference numerals, respectively, and redundant description of such elements is omitted or simplified according to need. The shapes, the sizes, the arrangement, and other factors of the elements illustrated in the drawings may be changed according to need.

Embodiment 1

Figure 2:
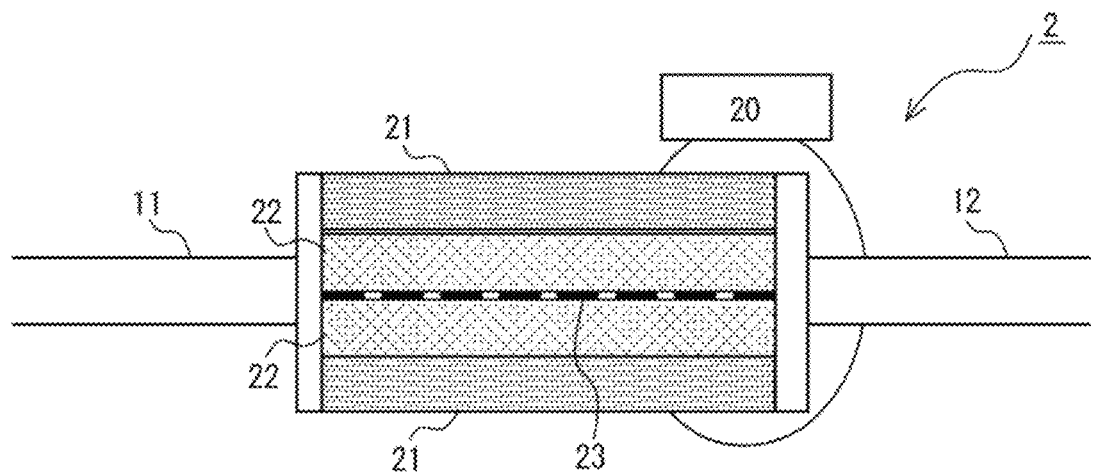
FIG. 2 is a schematic diagram of a water-treating unit included in the water-using apparatus according to Embodiment 1.

FIG. 1 is a schematic diagram of a water-using apparatus according to Embodiment 1. FIG. 2 is a schematic diagram of a water-treating unit included in the water-using apparatus according to Embodiment 1.

As illustrated in FIG. 1, the water-using apparatus, 100, according to Embodiment 1 includes a water-feeding unit 1, a water-treating unit 2, a water-using unit 3, a first three-way valve 4, a second three-way valve 5, and a controller 6. The water-feeding unit 1 and the first three-way valve 4 are connected to each other by a first pipe 10. The water-feeding unit 1 and the water-treating unit 2 are connected to each other by a second pipe 11. The water-treating unit 2 and the second three-way valve 5 are connected to each other by a third pipe 12. The first three-way valve 4 and the second three-way valve 5 are connected to each other by a fourth pipe 13. The first three-way valve 4 and the water-using unit 3 are connected to each other by a fifth pipe 14. The second three-way valve 5 is provided with a drainpipe 15.

The water-feeding unit 1 feeds water to the water-treating unit 2 and to the water-using unit 3. The water-feeding unit 1 feeds water to the water-treating unit 2 through the second pipe 11. The water-feeding unit 1 feeds water to the water-using unit 3 through the first pipe 10, the first three-way valve 4, and the fifth pipe 14. A passage formed of the first pipe 10, the first three-way valve 4, and the fifth pipe 14 serves as a direct water-feeding passage, through which water from the water-feeding unit 1 flows directly to the water-using unit 3.

The water-feeding unit 1 only needs to feed water to the water-treating unit 2 and to the water-using unit 3 and may be, for example, a water tap or a water pipe intended to feed tap water or industrial water. The water-feeding unit 1 may include a tank or any other storage and feed water stored in the tank to the water-treating unit 2 or to the water-using unit 3. The water-feeding unit 1 may further include a pump or any other sending device that sends water. The water-feeding unit 1 may be one of at least two water-feeding units 1. The at least two water-feeding units 1 include a water-feeding unit for feeding water to the first pipe 10, and a water-feeding unit for feeding water to the water-treating unit 2 through the second pipe 11. In such a configuration, the at least two water-feeding units can feed water of different qualities, respectively.

As illustrated in FIGS. 1 and 2, the water-treating unit 2 is connected to the water-feeding unit 1 by the second pipe 11 and is configured to perform a deionization function in which ionic substances contained in the water fed from the water-feeding unit 1 are removed from the water by causing electrodes 22 to adsorb ionic substances by electrical means, and a refreshment function in which ionic substances adsorbed to the electrodes 22 are electrically released into the water. The water-treating unit 2 illustrated in FIG. 2 removes ionic substances by, for example, a capacitive deionization method.

As illustrated in FIG. 2, the water-treating unit 2 includes a direct-current power source 20, a pair of current collectors 21, a pair of electrodes 22, and a separator 23. The direct-current power source 20 is connected to the current collectors 21. The direct-current power source 20 applies electricity to the current collectors 21, whereby the electricity is applied to the electrodes 22. To remove ionic substances from the water, the water-treating unit 2 performs a deionization process in which ionic substances contained in the water fed from the water-feeding unit 1 are removed from the water by causing the electrodes 22 to absorb ionic substances with the application of electricity to the electrodes 22. After performing the deionization process, the water-treating unit 2 performs a refreshment process in which ionic substances adsorbed to the electrodes 22 are released into the water by any of the following: disabling the application of the direct-current voltage or direct current during deionization, that is, stopping the application of the direct-current voltage or direct current during deionization; establishing a short circuit between the current collectors 21; and applying a direct-current voltage or direct current in a direction opposite to that applied in the deionization process. The water with increased concentration of ionic substances released thereto in the refreshment process performed by the water-treating unit 2 is drained through the drainpipe 15. The electrodes 22 of the water-treating unit 2 are cleansed in the refreshment process, whereby the water-treating unit 2 restores the effectiveness for deionization.

The direct-current power source 20 is connected to the controller 6. The controller 6 controls the application of electricity. That is, the deionization process and the refreshment process to be performed by the water-treating unit 2 are controlled by the controller 6 on the basis of the state of activation of the water-using unit 3. If the water-treating unit 2 employs a capacitive deionization method, the direct-current power source only needs to be capable of supplying a direct current. In such a case, the direct-current power source 20 may be a direct-current power source device or a direct-current stabilized power source device. The direct-current power source 20 may use electricity taken from an electric socket and converted into a direct current by a device such as a converter.

The current collectors 21 apply the electricity received from the direct-current power source 20 to the electrodes 22 and collect electricity that is discharged from the electrodes 22 in the refreshment process performed by the water-treating unit 2. The material for the current collectors 21 is, for example, graphite sheet, grafoil, conductive rubber, or a metal sheet or plate held between or enclosed by any of the foregoing materials. That is, the current collectors 21 are formed from an electrically conductive and flexible material. While the present configuration includes a single pair of current collectors 21, a configuration including a plurality of pairs of current collectors 21 may be employed.

The electrodes 22 are formed from a material that is electrically conductive and has a large specific surface area so that, for example, an increased capacity as a capacitor can be obtained. Such a material may be activated carbon, porous carbon, porous conductive beads, porous metal, or any other like material. These electrically conductive materials are provided in some different forms such as powder, grains, and fibers. If the electrically conductive material is in the form of powder or grains, the powder or grains have an outside diameter of 100 nm to 10 mm. If the electrically conductive material is in the form of fibers, the fibers have a thickness of 1 to 50 μm.

The electrodes 22 may each be provided in another form such as a piece of cloth or a filter obtained from any of the above electrically conductive materials. If there is a possibility that the electrodes 22 may leak from the water-treating unit 2, a leakage-preventing element may be provided at the exit of the water-treating unit 2 or between the water-treating unit 2 and the water-using unit 3. If a leakage-preventing element is provided, elements forming the water-treating unit 2, including the electrode material, can be prevented from leaking to the water-using unit 3. Accordingly, adverse effects of the leakage of such elements from the water-treating unit 2 upon the water-using unit 3 can be reduced. While the present configuration includes a single pair of electrodes 22, a configuration including a plurality of pairs of electrodes 22 may be employed.

The separator 23 is provided for preventing the short-circuiting between the electrodes 22. The separator 23 is formed from an electrically insulating material that transmits liquid but does not transmit electrically conductive materials. Examples of such an electrically insulating material include filter paper, porous film, nonwoven fabric, and a foaming agent. While FIG. 2 illustrates a case where a single separator 23 is provided, a plurality of separators 23 may be provided.

The performance exerted by the water-using unit 3 naturally deteriorates with the deposition of scales of ionic substances or any other relevant matter. The water-using unit 3 according to Embodiment 1 is, for example, a humidifier configured to use water having flowed through the water-treating unit 2. If the water-using unit 3 is a humidifier, the deterioration in humidification performance can be eased by suppressing the deposition of scales on a humidifying element.

The controller 6 checks the status of the water-treating unit 2 and the status of the water-using unit 3 for reference in determining which of the deionization process and the refreshment process is to be performed by the water-treating unit 2, and accordingly controls the first three-way valve 4, the second three-way valve 5, and the direct-current power source 20. The controller 6 may be a device, such as a PLC (programmable logic controller); a sequencer; or a numerical control device, configured to operate the apparatus in accordance with specified conditions. The controller 6 includes a storage unit that stores the history of operations including the time periods of past performances of the deionization process and the refreshment process, and initially inputted data.

Figure 3:
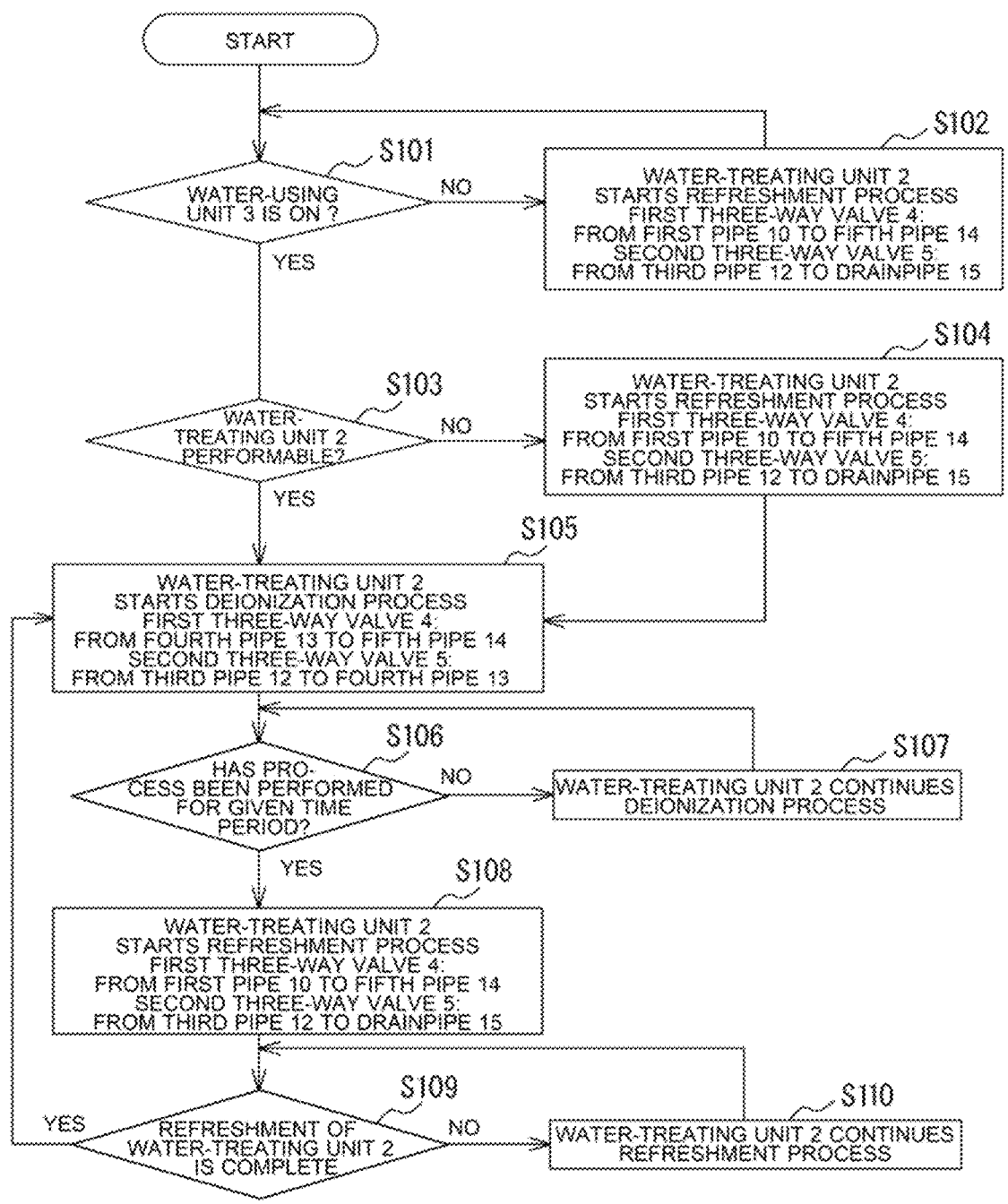
FIG. 3 is a flow chart illustrating an operation of the water-using apparatus according to Embodiment 1.

An operation of the water-using apparatus 100 according to Embodiment 1 will now be described with reference to the flow chart illustrated in FIG. 3. FIG. 3 is a flow chart illustrating an operation of the water-using apparatus according to Embodiment 1.

First, in Step S101, the controller 6 checks whether the water-using unit 3 is active. If the controller 6 has determined that the water-using unit 3 is not active, the controller 6 proceeds to Step S102. In Step S102, the controller 6 controls the first three-way valve 4 in such a manner as to establish a passage for water to flow from the first pipe 10 to the fifth pipe 14. Furthermore, the controller 6 controls the second three-way valve 5 in such a manner as to establish a passage for water to flow from the third pipe 12 to the drainpipe 15. Then, the controller 6 causes the water-treating unit 2 to start the refreshment process. After the refreshment process is complete, the controller 6 stands by until the water-using unit 3 is activated. In the refreshment process started by the water-treating unit 2, the water-feeding unit 1 feeds water to the water-using unit 3 through the first pipe 10, the first three-way valve 4, and the fifth pipe 14. In the refreshment process started by the water-treating unit 2, the water-feeding unit 1 further feeds water to the water-treating unit 2 through the second pipe 11, whereby refreshment is performed. Drain water resulting from this process is drained through the third pipe 12, the second three-way valve 5, and the drainpipe 15. After the refreshment is complete, the controller 6 returns to Step S101 and stands by, without applying any direct-current voltage or direct current, until the water-using unit 3 is activated.

In Step S101, if the controller 6 has determined that the water-using unit 3 is active, the controller 6 proceeds to Step S103 and checks whether the water-treating unit 2 is in a state in which it can perform the deionization process. Specifically, to check whether the water-treating unit 2 is in a state in which it can perform the deionization process, the controller 6 checks the voltage occurring between the current collectors 21 of the water-treating unit 2 that is free of any direct-current voltage or direct current. The voltage between the current collectors 21 is measured with a voltmeter, which is not illustrated. The voltmeter serves as an electricity-detecting unit and is connected to the water-treating unit 2 and to the controller 6. If the voltage between the current collectors 21 is higher than or equal to a given reference, the controller 6 determines that the electrodes 22 have adsorbed ionic substances in the water and that the refreshment process therefore needs to be performed by the water-treating unit 2. If the voltage between the current collectors 21 is lower than the given reference, the controller 6 determines that the electrodes 22 are effective for adsorbing ionic substances and that the water-treating unit 2 is therefore in a state in which it can perform the deionization process. The given reference is determined from the result of an evaluation of the deionization characteristic exerted by the water-treating unit 2. The evaluation is conducted beforehand through an experiment or any other way for finding the relationship between the state of deionization of the water-treating unit 2 and the voltage occurring between the current collectors 21. Alternatively, the given reference may be determined from the profile of the voltage occurring between the current collectors 21 during the deionization process performed for the first time by the water-treating unit 2.

The reference for determining whether the water-treating unit 2 is in a state in which it can perform the deionization process is not limited to the above voltage occurring between the current collectors 21 and may be any of the following: the time period of the last performance of the refreshment process, the time period of the last performance of the deionization process, the history of performance of the refreshment process, and the electrical status of the water-treating unit 2.

Here, a case where the determination of whether the water-treating unit 2 is in a state in which it can perform the deionization process is made from the time period of the last performance of the refreshment process will be described. If the time period of the last performance of the refreshment process is longer than or equal to a given time period, the controller 6 determines that the water-treating unit 2 has been fully refreshed and is in a state in which it can perform the deionization process. If the time period of the last performance of the refreshment process is shorter than the given time period, the controller 6 determines that the water-treating unit 2 still needs to be refreshed.

The given time period is determined from the result of an evaluation of the time period required for the refreshment of the water-treating unit 2. The evaluation is conducted beforehand through an experiment or any other way, and the result of the evaluation is stored in the controller 6 for the determination. Alternatively, the given time period may be determined from the result of a measurement of temporal changes in the voltage or current occurring between the current collectors 21 during the refreshment process. The result of the measurement is stored in the controller 6. Then, the time period taken for the measured voltage or current to become constant may be defined as the given time period. In such a case, the following are each connected to the water-treating unit 2 and to the controller 6: a time-measuring unit such as a timer capable of measuring the time period of the refreshment process, and an electricity-checking unit such as a voltmeter capable of measuring the voltage occurring between the current collectors 21 of the water-treating unit 2 or an ammeter capable of measuring the current flowing between the current collectors 21.

Now, a case where the determination of whether the water-treating unit 2 is in a state in which it can perform the deionization process is made from the time period of the last performance of the deionization process will be described. If the time period of the last performance of the deionization process is longer than or equal to a given time period, the controller 6 determines that the water-treating unit 2 needs to be refreshed. If the time period of the last performance of the deionization process is shorter than the given time period, the controller 6 determines that the water-treating unit 2 is still in a state in which it can perform the deionization process.

The given time period is determined from the result of an evaluation of the maximum time period over which the water-treating unit 2 remains in a state in which it can perform the deionization process. The evaluation is conducted beforehand through an experiment, and the result of the evaluation is stored in the controller 6 for the determination. Alternatively, the given time period may be determined from the result of a measurement of temporal changes in the voltage or current occurring between the current collectors 21 during the deionization process. The result of the measurement is stored in the controller 6. Then, the time period taken for the measured voltage or current to become constant may be defined as the given time period. In such a case, the following are each connected to the water-treating unit 2 and to the controller 6: a time-measuring unit such as a timer capable of measuring the time period of the deionization process, and an electricity-checking unit such as a voltmeter capable of measuring the voltage occurring between the current collectors 21 of the water-treating unit 2 or an ammeter capable of measuring the current flowing between the current collectors 21.

Now, a case where the determination of whether the water-treating unit 2 is in a state in which it can perform the deionization process is made from the history of performance of the refreshment process will be described. If the time period of the deionization process performed after the last performance of the refreshment process is shorter than or equal to a given time period, the controller 6 determines that the water-treating unit 2 is still in a state in which it can perform the deionization process. If the time period of the deionization process performed after the last performance of the refreshment process is longer than the given time period, the controller 6 determines that the water-treating unit 2 needs to be refreshed.

The given time period is determined from the result of an evaluation of the maximum time period over which the water-treating unit 2 remains in a state in which it can perform the deionization process. The evaluation is conducted beforehand through an experiment, and the result of the evaluation is stored in the controller 6 for the determination. Alternatively, the given time period may be determined from the result of a measurement of temporal changes in the voltage or current occurring between the current collectors 21 during the deionization process. The result of the measurement is stored in the controller 6. Then, the time period taken for the measured voltage or current to become constant may be defined as the given time period. In such a case, the following are each connected to the water-treating unit 2 and to the controller 6: a time-measuring unit such as a timer capable of measuring the time period of the deionization process, and an electricity-checking unit such as a voltmeter capable of measuring the voltage occurring between the current collectors 21 of the water-treating unit 2 or an ammeter capable of measuring the current flowing between the current collectors 21.

The electrical status of the water-treating unit 2 is represented by any of relevant values including the following: the voltage between the current collectors 21 or the electrodes 22 of the water-treating unit 2, the value of the current that flows when the pair of current collectors 21 are short-circuited therebetween, and the voltage between the pair of current collectors 21 that occurs when the pair of current collectors 21 are short-circuited therebetween.

In Step S103, if the controller 6 has determined that the water-treating unit 2 is not in a state in which it can perform the deionization process, the controller 6 proceeds to Step S104. In Step S104, the controller 6 controls the first three-way valve 4 in such a manner as to establish a passage for water to flow from the first pipe 10 to the fifth pipe 14. Furthermore, the controller 6 controls the second three-way valve 5 in such a manner as to establish a passage for water to flow from the third pipe 12 to the drainpipe 15. Then, the controller 6 causes the water-treating unit 2 to start the refreshment process. When the refreshment process is complete, the controller 6 proceeds to Step S105.

On the other hand, in Step S103, if the controller 6 has determined that the water-treating unit 2 is in a state in which it can perform the deionization process, the controller 6 proceeds to Step S105. In Step S105, the controller 6 controls the first three-way valve 4 in such a manner as to establish a passage for water to flow from the fourth pipe 13 to the fifth pipe 14. Furthermore, the controller 6 controls the second three-way valve 5 in such a manner as to establish a passage for water to flow from the third pipe 12 to the fourth pipe 13. Then, the controller 6 causes the water-treating unit 2 to start the deionization process.

Subsequently, in Step S106, the controller 6 checks whether the water-treating unit 2 has performed the deionization process for the given time period. The given time period is determined from the result of an evaluation of the maximum time period over which the water-treating unit 2 remains in a state in which it can perform the deionization process. The evaluation is conducted beforehand through an experiment, and the result of the evaluation is stored in the controller 6 for the determination. Alternatively, the given time period may be determined from the result of a measurement of temporal changes in the voltage or current occurring between the current collectors 21 during the deionization process. The result of the measurement is stored in the controller 6. Then, the time period taken for the measured voltage or current to become constant may be defined as the given time period. In such a case, the following are each connected to the water-treating unit 2 and to the controller 6: a time-measuring unit such as a timer capable of measuring the time period of the deionization process, and an electricity-checking unit such as a voltmeter capable of measuring the voltage occurring between the current collectors 21 of the water-treating unit 2 or an ammeter capable of measuring the current flowing between the current collectors 21.

If the controller 6 has determined that the deionization process has not been performed for the given time period yet, the controller 6 proceeds to Step S107 to continue the deionization process. Then, the controller 6 returns to Step S106 and checks whether the water-treating unit 2 has performed the deionization process for the given time period.

On the other hand, if the controller 6 has determined that the deionization process has been performed for the given time period, the controller 6 ends the deionization process and proceeds to Step S108. In Step S108, the controller 6 controls the first three-way valve 4 in such a manner as to establish a passage for water to flow from the first pipe 10 to the fifth pipe 14. Furthermore, the controller 6 controls the second three-way valve 5 in such a manner as to establish a passage for water to flow from the third pipe 12 to the drainpipe 15. Then, the controller 6 causes the water-treating unit 2 to start the refreshment process.

Subsequently, in Step S109, the controller 6 checks whether the refreshment process started by the water-treating unit 2 is complete. The determination of whether the refreshment process started by the water-treating unit 2 is complete is made from the duration of the refreshment process. Specifically, when the duration of the refreshment process reaches the given time period, the refreshment process is ended. The duration of the refreshment process is measured with a timer provided to the controller 6. The given time period is determined from the result of an evaluation of the time period required for the refreshment of the water-treating unit 2. The evaluation is conducted beforehand through an experiment or any other way, and the result of the evaluation is stored in the controller 6 for the determination. Alternatively, the given time period may be determined from the result of a measurement of temporal changes in the voltage or current occurring between the current collectors 21 during the refreshment process. The result of the measurement is stored in the controller 6. Then, the time period taken for the measured voltage or current to become constant may be defined as the given time period. In such a case, the following are each connected to the water-treating unit 2 and to the controller 6: a time-measuring unit such as a timer capable of measuring the time period of the refreshment process, and an electricity-checking unit such as a voltmeter capable of measuring the voltage occurring between the current collectors 21 of the water-treating unit 2 or an ammeter capable of measuring the current flowing between the current collectors 21.

The determination of whether the refreshment process is complete may be made from, for example, the voltage occurring between the current collectors 21 of the water-treating unit 2, or the value of the current that flows when the pair of current collectors 21 are short-circuited therebetween. The controller 6 regards the time when the voltage or current occurring between the current collectors 21 during the refreshment process becomes constant as the time when the refreshment process is complete. In such a case, an electricity-checking unit such as a voltmeter capable of measuring the voltage occurring between the current collectors 21 of the water-treating unit 2 or an ammeter capable of measuring the current flowing between the current collectors 21 is connected to the water-treating unit 2 and to the controller 6.

If the controller 6 has determined that the refreshment process started by the water-treating unit 2 is not complete, the controller 6 proceeds to Step S110 to continue the refreshment process. Then, the controller 6 returns to Step S109 and checks whether the refreshment process started by the water-treating unit 2 is complete.

On the other hand, if the controller 6 has determined that the refreshment process started by the water-treating unit 2 is complete and if the water-using unit 3 is active, the controller 6 proceeds to the deionization process. If the water-using unit 3 is inactivated, the controller 6 proceeds to the refreshment process to be performed by the water-treating unit 2.

The reference for determining whether to end the deionization process is not limited to the duration. For example, the determination of whether to end the deionization process may be made from the result of detection of the quality of water fed from the water-feeding unit 1 and the quality of water discharged from the water-treating unit 2. The detection is performed by using water-quality-detecting units provided on the upstream side and the downstream side, respectively, of the water-treating unit 2.

Specifically, such water-quality-detecting units may be conductivity meters that measure the electric conductivity of water. The conductivity meters are provided on a side of the water-treating unit 2 on which the second pipe 11 is provided and a side of the water-treating unit 2 on which the third pipe 12 is provided, respectively. If the electric conductivity of the water discharged from the water-treating unit 2 during the deionization process reaches a given reference or higher, the controller 6 determines that the water-treating unit 2 needs to be refreshed, and proceeds to the refreshment process. The given reference only needs to be lower than or equal to the electric conductivity of the water fed from the water-feeding unit 1, that is, the electric conductivity of the water flowing into the water-treating unit 2.

The refreshment process is ended when the value obtained through the division of the electric conductivity of the water discharged from the water-treating unit 2 by the electric conductivity of the water fed from the water-feeding unit 1 to the water-treating unit 2 drops to the given reference or lower. The given reference is a value ranging from 1 to 2. In the refreshment process, since no ionic substances are removed, there is no possibility that the electric conductivity of the water discharged from the water-treating unit 2 becomes lower than the electric conductivity of the water flowing into the water-treating unit 2. That is, there is no possibility that the value obtained through the division of the electric conductivity of the water discharged from the water-treating unit 2 by the electric conductivity of the water fed from the water-feeding unit 1 to the water-treating unit 2 becomes smaller than 1. Furthermore, in the refreshment process, if the value obtained through the division of the electric conductivity of the water discharged from the water-treating unit 2 by the electric conductivity of the water fed from the water-feeding unit 1 to the water-treating unit 2 is greater than 2, it is regarded that the desorption of ionic substances from the electrodes 22 of the water-treating unit 2 is insufficient, indicating that the refreshment of the water-treating unit 2 is not complete. The value obtained through the division of the electric conductivity of the water discharged from the water-treating unit 2 by the electric conductivity of the water fed from the water-feeding unit 1 is calculated by the controller 6, with the electric conductivities measured by the respective conductivity meters.

Alternatively, with a conductivity meter being provided on the side of the water-treating unit 2 on which the third pipe 12 is provided, the controller 6 may operate as follows. If the electric conductivity of the water discharged from the water-treating unit 2 reaches the given reference or higher, the controller 6 proceeds to the refreshment process. Then, in the refreshment process, if the electric conductivity once rises and then drops to the given reference or lower, the controller 6 determines that the refreshment process is complete.

Figure 4:
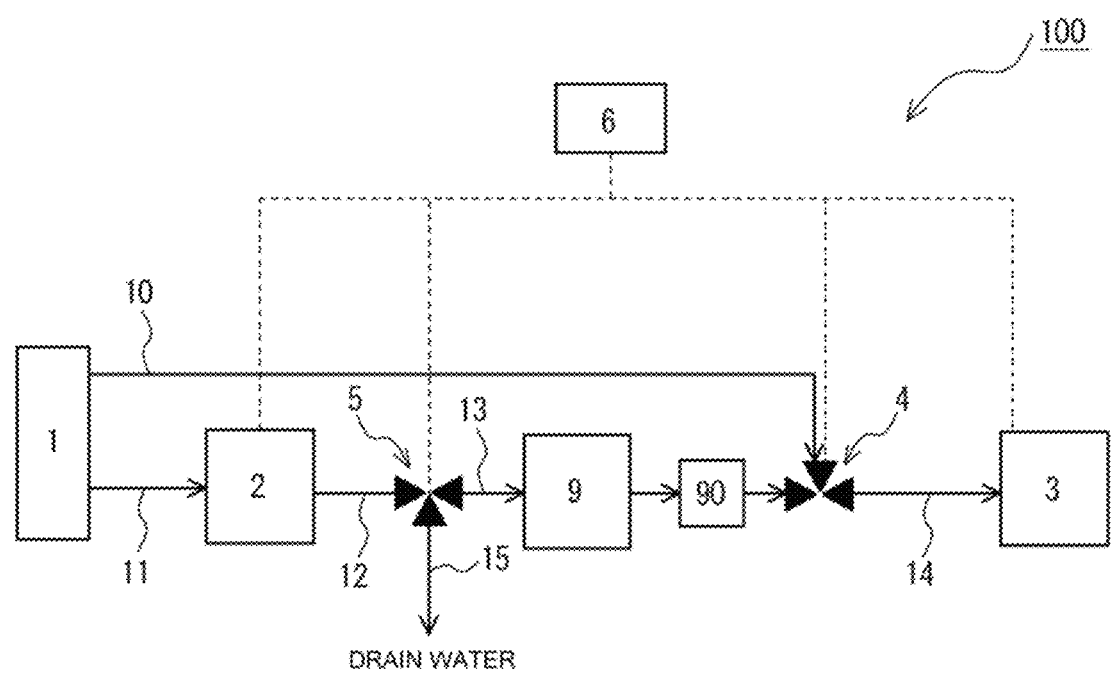
FIG. 4 is a schematic diagram illustrating a modification of the water-using apparatus according to Embodiment 1.

FIG. 4 is a schematic diagram illustrating a modification of the water-using apparatus according to Embodiment 1. The water-using apparatus 100 according to Embodiment 1 may include a tank 9 as illustrated in FIG. 4. The tank 9 stores water resulting from the removal of ionic substances that is performed by using the deionization function of the water-treating unit 2. In an exemplary configuration, the tank 9 is provided on the fourth pipe 13 together with a water-sending device 90. The water-sending device 90 is, for example, a pump and feeds the water stored in the tank 9 to the water-using unit 3. The water-sending device 90 may be separate from the tank as illustrated in FIG. 4 or may be included in the tank. The tank 9 does not necessarily need to be provided on the fourth pipe 13 and may be connected to another pipe, as long as the water resulting from the removal of ionic substances is storable therein.

That is, in the water-using apparatus 100 illustrated in FIG. 4, a certain amount of water treated in the deionization process can be stored in the tank 9, and the water thus stored in the tank 9 can be used for the refreshment process. If a certain amount of water treated in the deionization process is stored in the tank 9 for the refreshment process, the deionization process may be performed while the water-using unit 3 is inactive. Therefore, if the water treated by the water-treating unit 2 in the deionization process is used for the refreshment process that is performed by the water-treating unit 2, the water-treating unit 2 can be refreshed with water having good quality. Consequently, the time taken for the refreshment process can be reduced.

If the tank 9 that stores a certain amount of water treated in the deionization process is employed, the tank 9 may be regarded as a water-feeding unit. Accordingly, while the water-treating unit 2 is performing the refreshment process, the deionized water in the tank 9 may be fed to the water-using unit 3 through the first pipe 10, the first three-way valve 4, and the fifth pipe 14.

While the water-using apparatus 100 according to Embodiment 1 employs a capacitive deionization method in the water-treating unit 2, any other method such as electrodialysis may be employed, as long as deionization is electrically controllable. If electrodialysis is employed in the water-treating unit 2, the water-treating unit 2 is modified to include a pair of electrodes, a cation-exchanger membrane, and an anion-exchanger membrane. Ion-exchanger resin may further be provided between the cation-exchanger membrane and the anion-exchanger membrane. If electrodialysis is employed in the water-treating unit 2, a drainpipe that allows Drain water to be constantly drained is to be added. If electrodialysis is employed in the water-treating unit 2, the refreshment process is regarded as a process such as maintenance work, electrode transformation, or chemical cleansing. Such a refreshment process does not necessarily need to be performed after every deionization process, unlike in the capacitive deionization method. If chemical cleansing is necessary, a chemical tank is to be added. If electrodialysis is employed in the water-treating unit 2, the water-treating unit 2 is to be provided with a drain port for draining ion-concentrated water resulting from electrodialysis. The drain port may be connected to the drainpipe 15 illustrated in FIG. 1. If electrodialysis is employed in the water-treating unit 2, the refreshment process is not necessary, unlike in the capacitive deionization method. Therefore, the deionization process can be performed at any time. Furthermore, during the deionization process, ion-concentrated water is constantly drained through the drain port.

In the water-using apparatus 100 according to Embodiment 1, the first pipe 10 is connected to the first three-way valve 4 so that, during the refreshment process for the water-treating unit 2, water is fed from the water-feeding unit 1 to the water-using unit 3 through the first pipe 10, the first three-way valve 4, and the fifth pipe 14. Alternatively, the first pipe 10 may be connected directly to the water-using unit 3. In such a case, the first three-way valve 4 can be omitted. The controller 6 is connected to the water-feeding unit 1 and controls the water feeding from the water-feeding unit 1 to the first pipe 10.

The water-using apparatus 100 according to Embodiment 1 may include an additional water-treating unit at a halfway position of the first pipe 10. In such a case, while the water-treating unit 2 provided between the second pipe 11 and the third pipe 12 is performing the refreshment process, the additional water-treating unit provided on the first pipe 10 can perform the deionization process. Therefore, the water-using unit 3 can always receive deionized water from either of the water-treating units. The water-using apparatus 100 according to Embodiment 1 may include a plurality of water-treating units 2 arranged in parallel between the second pipe 11 and the third pipe 12. If the water-treating units 2 that are arranged in parallel are employed, while one of the water-treating units is performing the refreshment process, any of the other water-treating units can perform the deionization process.

The water-using unit 3, which has been described as a humidifier, may be any other device such as an air-conditioning device that uses water, a water heater, a cooling device, or a boiler. If the water-using unit 3 is an air-conditioning device that uses water, the deposition of scales in pipes or any other relevant elements that come into contact with water can be suppressed, whereby performance deterioration can be eased. If the water-using unit 3 is a water heater, the deposition of scales in pipes or any other relevant elements that come into water, particularly with hot water, can be suppressed, whereby performance deterioration can be eased. If the water-using unit 3 is a cooling device, the deposition of scales in pipes through which water flows can be suppressed, whereby performance deterioration can be eased. If the water-using unit 3 is a boiler, the deposition of scales in elements for combusting water can be suppressed, whereby performance deterioration can be eased.

To summarize, the water-using apparatus 100 according to Embodiment 1 includes the water-feeding unit 1 configured to feed water, the water-treating unit 2 connected to the water-feeding unit 1 by the pipe 11 and being configured to perform a function in which ionic substances contained in the water fed from the water-feeding unit 1 are removed by an electrical deionization unit, the water-using unit 3 connected to the water-treating unit 2 by the pipes (12, 13, and 14) and configured to use water having flowed through the water-treating unit 2, the drainpipe 15 through which water with increased concentration of ionic substances removed by the water-treating unit 2 is drained, and the controller 6 configured to control the passage for the water fed from the water-feeding unit 1 and to cause the water concentrated with ionic substances to be drained through the drainpipe 15. Hence, in the water-using apparatus 100, the passage of the water that is fed from the water-feeding unit 1 is controlled such that the water concentrated with ionic substances removed by the water-treating unit 2 is drained through the drainpipe 15. Therefore, the need of replacing ion-exchanger resin or any other like elements is eliminated. Consequently, the removal of ionic substances from the feedwater can be performed continuously for a long term.

The water-treating unit 2 is configured to perform the deionization function in which ionic substances contained in the water fed from the water-feeding unit 1 are removed from the water by causing the electrodes to absorb ionic substances, and the refreshment function in which ionic substances adsorbed to the electrodes are released into the water. The controller 6 is configured to execute a function of switching the water-treating unit 2 to perform deionization or refreshment. When the water-treating unit 2 is to perform deionization, the controller 6 establishes a passage for the water fed from the water-feeding unit 1 to flow into the water-using unit 3 through the water-treating unit 2. When the water-treating unit 2 is to perform refreshment, the controller 6 establishes a passage for the water fed from the water-feeding unit 1 to flow into the drainpipe 15 through the water-treating unit 2 to cause the water concentrated with ionic substances to be drained through the drainpipe 15.

Hence, in the water-using apparatus 100 according to Embodiment 1, even if the amount of ionic substances adsorbed to the electrodes 22 during deionization reaches the maximum capacity handleable by the water-treating unit 2, ionic substances adsorbed to the electrodes 22 can be released into the water by performing refreshment, and the water concentrated with ionic substances can be drained through the drainpipe 15. Therefore, the need of replacing ion-exchanger resin or any other like elements is eliminated. Consequently, the removal of scales from the feedwater can be performed continuously for a long term.

The water-feeding unit 1 and the water-using unit 3 are connected to each other by the pipes (10 and 14). When the water-treating unit 2 is to perform refreshment, the controller 6 establishes a passage for the water from the water-feeding unit 1 to flow directly to the water-using unit 3.

Hence, in the water-using apparatus 100 according to Embodiment 1, even if the water-treating unit 2 is under refreshment, water can be fed from the water-feeding unit 1 to the water-using unit 3. That is, water feeding from the water-feeding unit 1 is not stopped. Therefore, the water-using unit 3 can be used continuously. Such a configuration provides excellent usefulness.

The water-treating unit 2 is configured such that, in the deionization function, ionic substances contained in the water from the water-feeding unit 1 are removed from the water by causing the electrodes 22 to absorb ionic substances with the application of electricity. Furthermore, the water-treating unit 2 is configured such that, in the refreshment function, ionic substances adsorbed to the electrodes 22 are released into the water by any of the following: stopping the application of electricity, establishing a short circuit, and applying electricity in a direction opposite to a direction of electricity applied in the deionization process.

Hence, in the water-using apparatus 100 according to Embodiment 1, deionization and refreshment can be performed with a simple configuration, and the removal of scales in the feedwater can be performed continuously for a long term.

The water-treating unit 2 is configured to remove ionic substances by a capacitive deionization method. The electrodes 22 are formed from a material including granular activated carbon. Hence, in the water-using apparatus 100 according to Embodiment 1 including the water-treating unit 2 that removes ionic substances by a capacitive deionization method, if granular activated carbon that is electrically conductive and has a large specific surface area is employed, certain cavities are provided in the electrodes 22. Therefore, the water is allowed to flow smoothly. Consequently, the pressure loss can be reduced.

The water-using apparatus 100 according to Embodiment 1 includes the tank 9 that stores water resulting from the removal of ionic substances that is performed by using the deionization function of the water-treating unit 2. That is, in the water-using apparatus 100, the water treated in the deionization process can be stored in the tank 9, and the water thus stored can be used in the refreshment process. Therefore, the water-treating unit 2 can be refreshed with water having good quality. Consequently, the time taken for the refreshment process can be reduced. Furthermore, regarding the tank 9 as a water-feeding unit, while the water-treating unit 2 is performing the refreshment process, the deionized water in the tank 9 can be fed to the water-using unit 3 through the first pipe 10, the first three-way valve 4, and the fifth pipe 14.

Embodiment 2

Figure 5:
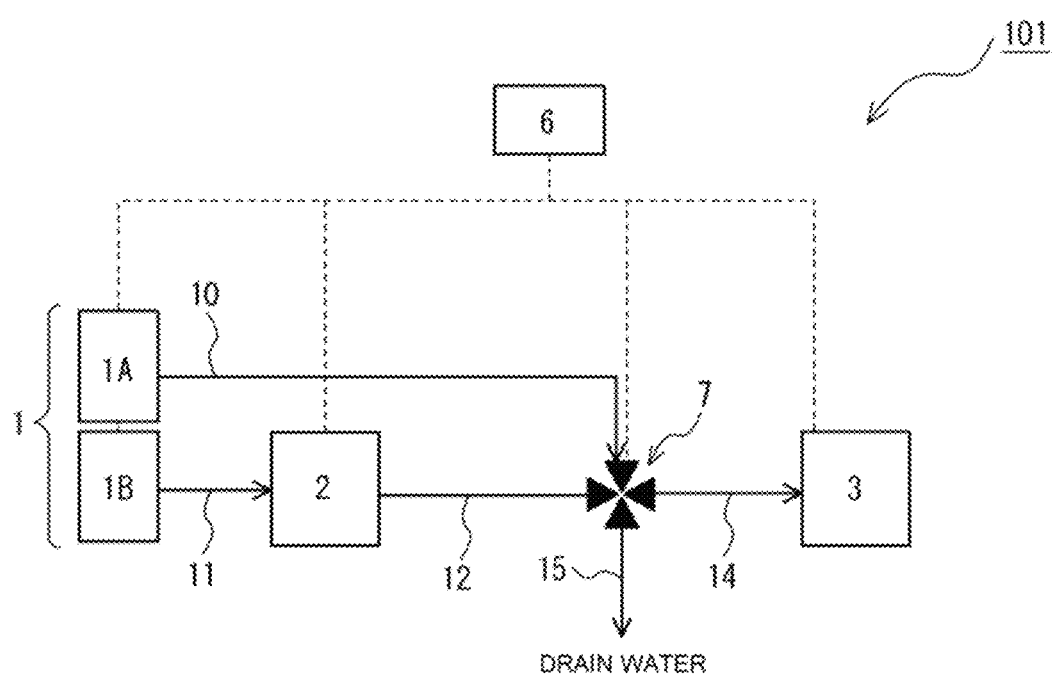
FIG. 5 is a schematic diagram of a water-using apparatus according to Embodiment 2.

A water-using apparatus 101 according to Embodiment 2 will now be described with reference to FIG. 5. FIG. 5 is a schematic diagram of a water-using apparatus according to Embodiment 2. Elements that are the same as those of the water-using apparatus 100 described in Embodiment 1 are denoted by corresponding ones of the reference signs used in Embodiment 1, and description of such elements is omitted accordingly.

As illustrated in FIG. 5, the water-using apparatus 101 according to Embodiment 2 includes a water-feeding unit 1, a water-treating unit 2, a water-using unit 3, a four-way valve 7, and a controller 6. The water-feeding unit 1 includes a first water-feeding unit 1A and a second water-feeding unit 1B. The first water-feeding unit 1A and the four-way valve 7 are connected to each other by a first pipe 10. The second water-feeding unit 1B and the water-treating unit 2 are connected to each other by a second pipe 11. The water-treating unit 2 and the four-way valve 7 are connected to each other by a third pipe 12. The four-way valve 7 and the water-using unit 3 are connected to each other by a fifth pipe 14. The four-way valve 7 is provided with a drainpipe 15.

As illustrated in FIG. 5, in the water-using apparatus 101 according to Embodiment 2, the first water-feeding unit 1A feeds water to the first pipe 10, whereas the second water-feeding unit 1B feeds water to the second pipe 11. The water-using apparatus 101 according to Embodiment 2 includes the four-way valve 7 in replacement of the first three-way valve 4 and the second three-way valve 5 described in Embodiment 1. The controller 6 controls the four-way valve 7 in such a manner as to establish a passage for water to flow from the first pipe 10 to the fifth pipe 14. Furthermore, the controller 6 controls the four-way valve 7 in such a manner as to establish a passage for water to flow from the third pipe 12 to the fifth pipe 14. When the passage from the third pipe 12 to the fifth pipe 14 is established, the controller 6 stops the feeding of water from the first water-feeding unit 1A to the first pipe 10. When the passage from the first pipe 10 to the fifth pipe 14 is established, the controller 6 controls the four-way valve 7 in such a manner as to establish a passage for water from the second water-feeding unit 1B to flow through the second pipe 11, the water-treating unit 2, the third pipe 12, and the drainpipe 15.

While the water-using apparatus 101 according to Embodiment 2 is configured such that the four-way valve 7 is controlled by the controller 6, the four-way valve 7 is not limited thereto. For example, the four-way valve 7 may be a valve in which the passages to be established in the deionization process and the refreshment process performed by the water-treating unit 2 are controllable by utilizing the hydraulic pressure to be applied to the four-way valve 7 through the first pipe 10 when water is fed from the first water-feeding unit 1A to the four-way valve 7. Specifically, when water is fed to the first pipe and a hydraulic pressure is thus applied to the four-way valve 7, the four-way valve 7 establishes a passage for water to flow from the first pipe 10 to the fifth pipe 14. Furthermore, when water is fed to the first pipe 10 and a hydraulic pressure is thus applied to the four-way valve 7, the four-way valve 7 establishes a passage for water to flow from the third pipe 12 to the drainpipe 15.

If the controller 6 has determined that the refreshment process needs to be performed by the water-treating unit 2, the controller 6 causes the first water-feeding unit 1A to feed water to the four-way valve 7 through the first pipe 10, thereby establishing the passage for water to flow from the first pipe 10 to the fifth pipe 14 and the passage for water to flow from the third pipe 12 to the drainpipe 15. Drain water resulting from the refreshment process performed by the water-treating unit 2 is drained through the drainpipe 15. That is, even during the refreshment process, water can be fed from the first water-feeding unit 1A to the water-using unit 3 through the first pipe 10, the four-way valve 7, and the fifth pipe 14. If no water is fed from the first water-feeding unit 1A, the controller 6 causes the four-way valve 7 to establish the passage for water to flow from the third pipe 12 to the fifth pipe 14.

While Embodiment 2 relates to a configuration in which the water-feeding unit 1 is divided into the first water-feeding unit 1A and the second water-feeding unit 1B, the water-feeding unit 1 may be provided as a single unit, and a device such as a three-way valve may be provided inside the water-feeding unit 1 so that the direction of water feeding can be controlled.

The water-using apparatus 101 according to Embodiment 2 may include a tank, which is not illustrated. The tank stores water resulting from the removal of ionic substances that is performed by using the deionization function of the water-treating unit 2. In an exemplary configuration, the tank is provided on the third pipe 12 together with a water-sending device. Note that the tank may be connected to another pipe, as long as the water resulting from the removal of ionic substances is storable therein.

Hence, in the water-using apparatus 101 according to Embodiment 2 as well, even if the amount of ionic substances adsorbed to the electrodes 22 during deionization reaches the maximum capacity handleable by the water-treating unit 2, ionic substances adsorbed to the electrodes 22 can be released into the water by performing refreshment, and the water concentrated with ionic substances can be drained through the drainpipe 15. Therefore, the need of replacing ion-exchanger resin or any other like elements is eliminated. Consequently, the removal of scales from the feedwater can be performed continuously for a long term. Furthermore, in the water-using apparatus 101, a single four-way valve 7 exerts functions to be exerted by a plurality of three-way valves. Therefore, the size of the apparatus 101 as a whole can be reduced.

The water-feeding unit 1 is one of at least two water-feeding units 1. At least one of the plurality of water-using units 1 is connected to the water-using unit 3 by the pipes (10 and 14). At least another one of the plurality of water-feeding units 1 is connected to the water-treating unit 2 by the pipe 11. Hence, while the water-treating unit 2 is performing the refreshment process, water can be fed to the water-using unit 3 from one of the water-feeding units that is different from the one used for feeding water to the water-treating unit 2. Such a configuration provides excellent usefulness.

Embodiment 3

Figure 6:
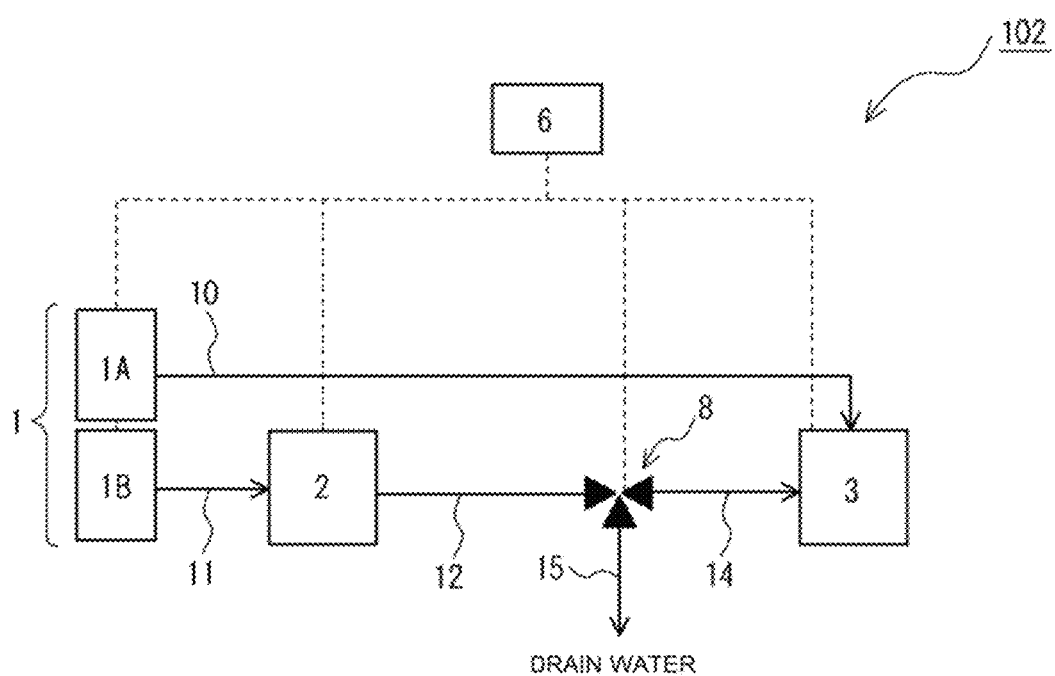
FIG. 6 is a schematic diagram of a water-using apparatus according to Embodiment 3.

A water-using apparatus 102 according to Embodiment 3 will now be described with reference to FIG. 6. FIG. 6 is a schematic diagram of a water-using apparatus according to Embodiment 3. Elements that are the same as those of the water-using apparatus 100 described in Embodiment 1 are denoted by corresponding ones of the reference signs used in Embodiment 1, and description of such elements is omitted accordingly.

As illustrated in FIG. 6, the water-using apparatus 102 according to Embodiment 3 includes a water-feeding unit 1, a water-treating unit 2, a water-using unit 3, a three-way valve 8, and a controller 6. The water-feeding unit 1 includes a first water-feeding unit 1A and a second water-feeding unit 1B. The first water-feeding unit 1A and the water-using unit 3 are connected to each other by a first pipe 10. The second water-feeding unit 1B and the water-treating unit 2 are connected to each other by a second pipe 11. The water-treating unit 2 and the three-way valve 8 are connected to each other by a third pipe 12. The three-way valve 8 and the water-using unit 3 are connected to each other by a fifth pipe 14. The three-way valve 8 is provided with a drainpipe 15.

In the water-using apparatus 102 according to Embodiment 3, the first water-feeding unit 1A and the water-using unit 3 are directly connected to each other by the first pipe 10. In the water-using apparatus 102, while the water-treating unit 2 is performing the deionization process, water from the second water-feeding unit 1B is fed to the water-treating unit 2 through the second pipe 11, and water treated by the water-treating unit 2 flows through the third pipe 12, the three-way valve 8, and the fifth pipe 14 and is fed to the water-using unit 3. When the water-treating unit 2 needs to perform the refreshment process, the controller 6 controls the three-way valve 8 in such a manner as to establish a passage for water to flow from the third pipe 12 to the drainpipe 15, thereby draining Drain water, which is discharged from the water-treating unit 2 in the refreshment process, through the drainpipe 15. In this process, if the water-using unit 3 is active, water is fed from the first water-feeding unit 1A to the water-using unit 3 through the first pipe 10.

While Embodiment 3 relates to a configuration in which the water-feeding unit 1 is divided into the first water-feeding unit 1A and the second water-feeding unit 1B, the water-feeding unit 1 may be provided as a single unit, and a device such as a three-way valve may be provided inside the water-feeding unit 1 so that the direction of water feeding can be controlled.

The water-using apparatus 102 according to Embodiment 3 may include a tank, which is not illustrated. The tank stores water resulting from the removal of ionic substances that is performed by using the deionization function of the water-treating unit 2. In an exemplary configuration, the tank is provided on the third pipe 12 together with a water-sending device. Note that the tank may be connected to another pipe, as long as the water resulting from the removal of ionic substances is storable therein.

Hence, in the water-using apparatus 102 according to Embodiment 3 as well, even if the amount of ionic substances adsorbed to the electrodes 22 during deionization reaches the maximum capacity handleable by the water-treating unit 2, ionic substances adsorbed to the electrodes 22 can be released into the water by performing refreshment, and the water concentrated with ionic substances can be drained through the drainpipe 15. Therefore, the need of replacing ion-exchanger resin or any other like elements is eliminated. Consequently, the removal of scales from the feedwater can be performed continuously for a long term. Furthermore, in the water-using apparatus 102, the number of three-way valves is reduced. Therefore, the size of the apparatus 102 as a whole can be reduced.

While the water-using apparatuses (100, 101, and 102) according to some embodiments have been described above, the configurations of the water-using apparatuses (100, 101, and 102) are not limited to those described in the above embodiments. For example, the water-using apparatuses (100, 101, and 102) are not limited to those described above and may each include other elements. In short, the water-using apparatuses (100, 101, and 102) encompass any design changes and applied variations that are normally made by those skilled in the art without departing from the technical scope thereof.

REFERENCE SIGNS LIST

1: water-feeding unit, 1A: first water-feeding unit, 1B: second water-feeding unit, 2: water-treating unit, 3:

water-using unit, 4: first three-way valve, 5: second three-way valve, 6: controller, 7: four-way valve, 8: three-way valve, 9: tank, 10: first pipe, 11: second pipe, 12: third pipe, 13: fourth pipe, 14: fifth pipe, 15: drainpipe, 20: direct-current power source, 21: current collector, 22: electrode, 23: separator, 90: water-sending device, 100, 101, 102: water-using apparatus

The invention claimed is:

1. A water-using apparatus including an electrical deionization unit configured to perform a deionization process in which ionic substances contained in water fed are removed from the water by causing electrodes to adsorb the ionic substances and a refreshment function in which the ionic substances adsorbed to the electrodes are released into the water, the water-using apparatus comprising:
a water-feeding unit configured to feed water,
a water-treating unit connected to the water-feeding unit by a pipe and being configured to perform a function in which the ionic substances contained in the water fed from the water-feeding unit are removed by the electrical deionization unit;
a water-using unit connected to the water-treating unit by a pipe and configured to use the water having flowed through the water-treating unit;
a drainpipe through which water with increased concentration of the ionic substances removed by the water-treating unit is drained; and
a controller configured to control a passage for the water fed from the water-feeding unit based on a state of the water-treating unit regarding whether the water-treating unit is in a state in which the water-treating unit can perform the deionization process and a state of the water-using unit regarding whether the water-using unit is active, and to cause the water with increased concentration of the ionic substances to be drained through the drainpipe, the controller being configured to, upon activation of the water-using unit, check whether the water-treating unit is in the state in which the water-treating unit can perform the deionization process,
wherein the controller is configured to determine whether the water-treating unit is in the state in which the water-treating unit can perform the deionization process by checking:
a time period of a last performance of the refreshment function,
a time period of a last performance of the deionization process, or
a history of performance of the refreshment function.

2. The water-using apparatus of claim 1,
wherein the water-treating unit is configured to perform the deionization process in which the ionic substances contained in the water fed from the water-feeding unit are removed from the water by causing the electrodes to absorb the ionic substances; and the refreshment function in which the ionic substances adsorbed to the electrodes are released into the water, and
wherein the controller is configured to:
execute a function of switching the water-treating unit to perform the deionization process or the refreshment function,
when the water-treating unit is to perform the deionization process, establish a passage for the water fed from the water-feeding unit to flow into the water-using unit through the water-treating unit, and
when the water-treating unit is to perform the refreshment function, establish a passage for the water fed from the water-feeding unit to flow into the drainpipe through the water-treating unit to cause the water with increased concentration of the ionic substances to be drained through the drainpipe.

3. The water-using apparatus of claim 2,
wherein the water-feeding unit and the water-using unit are connected to each other by a pipe, and
wherein when the water-treating unit is to perform the refreshment function, the controller is configured to establish a passage for the water from the water-feeding unit to flow directly to the water-using unit.

4. The water-using apparatus of claim 2,
wherein the water-feeding unit includes at least two water-feeding units,
wherein at least one of the at least two water-feeding units is connected to the water-using unit by a pipe, and
wherein at least another one of the at least two water-feeding units is connected to the water-treating unit by a pipe.

5. The water-using apparatus of claim 2,
wherein the water-treating unit is configured such that
in the deionization process, the ionic substances contained in the water from the water-feeding unit are removed from the water by causing the electrodes to absorb the ionic substances with application of electricity to the electrodes, and
in the refreshment function, the ionic substances adsorbed to the electrodes are released into the water by stopping the application of electricity to the electrodes, establishing a short circuit, or applying electricity to the electrodes in a direction opposite to a direction of electricity applied during the deionization process.

6. The water-using apparatus of claim 2, wherein the electrodes are formed from a material including granular activated carbon.

7. The water-using apparatus of claim 1, wherein the water in the water-using unit is isolated from the water-feeding unit.

8. The water-using apparatus of claim 1, wherein the water fed by the water-feeding unit has not been treated by the water-treating unit.

9. The water-using apparatus of claim 1, further comprising a tank that stores the water resulting from removal of the ionic substances that is performed by the water-treating unit.

10. The water-using apparatus of claim 1, wherein the water-feeding unit is directly connected to the water-treating unit through a pipe.

11. The water-using apparatus of claim 1, wherein, when the water-treating unit is to perform the refreshment function, the controller is configured to establish a passage for the water from the water-feeding unit to simultaneously and separately flow:
to the water-using unit, and
into the drainpipe through the water-treating unit to cause the water with increased concentration of the ionic substances to be drained through the drainpipe.

12. The water-using apparatus of claim 11, wherein the water-using unit is a humidifier.

13. The water-using apparatus of claim 1, wherein the water-treating unit includes a direct-current power source, current collectors, the electrodes, and a separator.

14. The water-using apparatus of claim 1, wherein the controller is configured to determine whether the water-treating unit is in the state in which the water-treating unit can perform the deionization process by checking the time period of a last performance of the refreshment function.

15. The water-using apparatus of claim 1, wherein the controller is configured to determine whether the water-treating unit is in the state in which the water-treating unit can perform the deionization process by checking the time period of a last performance of the deionization process.

16. The water-using apparatus of claim 1, wherein the controller is configured to determine whether the water-treating unit is in the state in which the water-treating unit can perform the deionization process by checking the history of performance of the refreshment function.

17. A water-using apparatus including an electrical deionization unit configured to perform a deionization process in which ionic substances contained in water fed are removed from the water by causing electrodes to adsorb the ionic substances and a refreshment function in which the ionic substances adsorbed to the electrodes are released into the water, the water-using apparatus comprising:
- a water-feeding unit configured to feed water;
- a water-treating unit connected to the water-feeding unit by a pipe and being configured to perform a function in which the ionic substances contained in the water fed from the water-feeding unit are removed by the electrical deionization unit;
- a water-using unit connected to the water-treating unit by a pipe and configured to use the water having flowed through the water-treating unit;
- a drainpipe through which water with increased concentration of the ionic substances removed by the water-treating unit is drained; and
- a controller configured to control a passage for the water fed from the water-feeding unit based on a state of the water-treating unit regarding whether the water-treating unit is in a state in which the water-treating unit can perform the deionization process and a state of the water-using unit regarding whether the water-using unit is active, and to cause the water with increased concentration of the ionic substances to be drained through the drainpipe, the controller being configured to, upon activation of the water-using unit, check whether the water-treating unit is in the state in which the water-treating unit can perform the deionization process, wherein the water in the water-using unit is isolated from the water-feeding unit, and wherein the controller is configured to determine whether the water-treating unit is in the state in which the water-treating unit can perform the deionization process by checking:
- a time period of a last performance of the refreshment function,
- a time period of a last performance of the deionization process, or
- a history of performance of the refreshment function.

18. A water-using apparatus including an electrical deionization unit configured to perform a deionization process in which ionic substances contained in water fed are removed from the water by causing electrodes to adsorb the ionic substances and a refreshment function in which the ionic substances adsorbed to the electrodes are released into the water, the water-using apparatus comprising:
- a water-feeding unit configured to feed water;
- a water-treating unit connected to the water-feeding unit by a pipe and being configured to perform a function in which the ionic substances contained in the water fed from the water-feeding unit are removed by the electrical deionization unit;
- a water-using unit connected to the water-treating unit by a pipe and configured to use the water having flowed through the water-treating unit;
- a drainpipe through which water with increased concentration of the ionic substances removed by the water-treating unit is drained; and
- a controller configured to control a passage for the water fed from the water-feeding unit based on a state of the water-treating unit regarding whether the water-treating unit is in a state in which the water-treating unit can perform the deionization process and a state of the water-using unit regarding whether the water-using unit is active, and to cause the water with increased concentration of the ionic substances to be drained through the drainpipe, the controller being configured to, upon activation of the water-using unit, check whether the water-treating unit is in the state in which the water-treating unit can perform the deionization process, wherein the water fed by the water-feeding unit has not been treated by the water-treating unit, and wherein the controller is configured to determine whether the water-treating unit is in the state in which the water-treating unit can perform the deionization process by checking:
- a time period of a last performance of the refreshment function,
- a time period of a last performance of the deionization process, or
- a history of performance of the refreshment function.

* * * * *